United States Patent [19]

Kashio

[11] 4,003,031
[45] Jan. 11, 1977

[54] INFORMATION-ARRANGING DEVICE

[75] Inventor: Toshio Kashio, Tokyo, Japan

[73] Assignee: Casio Computer Co., Ltd., Tokyo, Japan

[22] Filed: Jan. 23, 1975

[21] Appl. No.: 543,362

[30] Foreign Application Priority Data

Jan. 24, 1974  Japan .............................. 49-10367

[52] U.S. Cl. .......................................... 340/172.5
[51] Int. Cl.² ...................... G06F 7/16; G06F 7/36
[58] Field of Search ............................... 340/172.5

[56] References Cited

UNITED STATES PATENTS

| 3,533,074 | 10/1974 | Webb | 340/172.5 |
|---|---|---|---|
| 3,587,057 | 6/1971 | Armstrong | 340/172.5 |
| 3,815,083 | 6/1974 | Dirks et al. | 340/172.5 |

Primary Examiner—Gareth D. Shaw
Assistant Examiner—C. T. Bartz
Attorney, Agent, or Firm—Flynn & Frishauf

[57] ABSTRACT

An information-arranging device, wherein a plurality of records information units are initially stored at random in first and second memories in a state separated by record-positioning codes. The records are read out one after another from the forward end of said first and second memories. The key words of every two records read out from said first and second memories are compared in respect of numerical largeness or value by a comparing circuit to determine the sequential order of said key words. The records, whose key words have thus been compared in numerical value are arranged in a decreasing or increasing sequential order to form a block with the intervening one of the information codes converted into a different code. Said sequentially arranged records are stored in a third memory in the form of a block. A write-readout cycle for determining the sequential order is repeated between the first and second memories on one hand and the third memory on the other to store the third memory with blocks made up of sequentially arranged records, said blocks being made twice longer each time said write-readout cycle is carried out.

6 Claims, 6 Drawing Figures

| $B_N$ | $B_N$ | $B_N$ | $B_N$ | $B_N$ | $B_N$ |
|---|---|---|---|---|---|
| 3 | 4 | 5 | 10 | 7 | |

~11a

| 9 | 8 | 1 | 2 | 6 | |
|---|---|---|---|---|---|
| $B_N$ | $B_N$ | $B_N$ | $B_N$ | $B_N$ | $B_N$ |

| $B_N$ | $B_K$ | $B_N$ | $B_K$ | $B_N$ | $B_K$ | $B_N$ |
|---|---|---|---|---|---|---|
| 3 | 9 | 1 | 5 | 6 | 7 | |

~12a

| 4 | 8 | 2 | 10 | | | |
|---|---|---|---|---|---|---|
| $B_N$ | $B_K$ | $B_N$ | $B_K$ | $B_N$ | | |

| $B_N$ | $B_K$ | $B_K$ | $B_K$ | $B_N$ | $B_K$ | $B_N$ |
|---|---|---|---|---|---|---|
| 3 | 4 | 8 | 9 | 6 | 7 | |

~12a

| 1 | 2 | 5 | 10 | | | |
|---|---|---|---|---|---|---|
| $B_N$ | $B_K$ | $B_K$ | $B_K$ | $B_N$ | | |

| $B_N$ | $B_K$ | $B_K$ | $B_K$ | $B_K$ | $B_K$ | $B_K$ | $B_K$ | $B_N$ |
|---|---|---|---|---|---|---|---|---|
| 1 | 2 | 3 | 4 | 5 | 8 | 9 | 10 | |

~12a

| 6 | 7 | | | | | | | |
|---|---|---|---|---|---|---|---|---|
| $B_N$ | $B_K$ | $B_N$ | | | | | | |

INFORMATION-ARRANGING DEVICE

BACKGROUND OF THE INVENTION

This invention relates to an information-arranging device for setting a plurality of information records in a desired sequential order according to the results of comparing the numerical largenesses or value of the key words of every two information units such records read out from two memories.

An information record, hereinafter referred to as "record", indicated on a recording sheet such as a bill is made up of a plurality of items of word information, for example, a bill number, date, customer, unit price, quantity, total amount cost, etc. For collection of such records, for example, it is necessary to arrange the numerical values of particular words given in numerous bills in a prescribed sequential order. With attention paid to bill numbers, said numbers have to be set in an increasing sequential order. Again with notice taken of total amounts, said total amounts have to be arranged in a decreasing sequential order. In this case, the known practice is to select the particular words of a given group of bills requiring comparison as key words, read out said key words to compare the numerical largeness or value thereof and repeat said comparison until a plurality of key words of a word information are set in a prescribed sequential order. With the prior art information-arranging device, however, the determination of the sequential order of a plurality of information units is carried out by presetting a memory capacity in anticipation of a maximum number of digits contained in the records. Therefore, the prior art information arranging device has the drawbacks that where the key words of a considerable portion of a given group of records have a smaller number of digits than said preset maximum number of digits used in determining a memory capacity, some of said memory capacity is wasted. The prior information-arranging device as a whole becomes bulky because a plurality of memories having such an unnecessarily large memory capacity must be provided and in consequence operation of the data-processing device, as well as its control is accomplished by a complicated process.

It is accordingly the object of this invention to provide an information-arranging device wherein a plurality of records are stored in a memory in a desired sequential order by comparing the numerical largenesses or values of the key words of said records without requiring the memory to have a wasteful capacity, even when sequential arrangement is to be made of a large number of recordable records, where key words denote numerical values having different numbers of digits.

SUMMARY OF THE INVENTION

According to the present invention, an informationarranging device comprises two input memory means, each being adapted to store one group of records, each record comprising a plurality of words including at least one key word, the records being arranged serially with record positioning codes (BN) or different position codes (BK) interposed among them. A comparator means is provided for comparing the key words of any two records read out from the two input memory means, respectively, and an output memory means is provided for storing, in response to a comparison output signal from the comparator means, one of the compared two records whose key word has priority and then the other record, together with a converted positioning code therebetween. A converting means is provided for converting a record positioning code (BN) between any two records whose key words have been compared into a different positioning code (Bk) before the records are stored in the output memory means. Positioning code-discriminating means is provided for determining whether a positioning code following each record read out from the input memory means is a record positioning code (BN) or a different positioning code (BK). Still further, a control circuit is provided for causing, when a record positioning code (BN) is discriminated by the positioning code-discriminating means, at least one record whose key word has been compared by the comparator means and has no priority to be stored in the output memory means after the record whose key word has been compared with that of the record and has priority, until a different positioning code (BK) is discriminated by the positioning code-discriminating means. The control circuit further causes, when a different positioning code (BK) is discriminated by said positioning code-discriminating means, the key word of a record following the different positioning code (BK) to be compared with the non-priority key word of the record, thereby storing in the output memory means one of the two records whose key word has priority upon receipt of a comparison output signal from the comparator means. Transfer means is provided for transferring to the two input memory means the records stored in the output memory means when all of the stored records are stored in the output memory means in a sequential order determined by the key word comparison which is repeatedly effected by the comparator means.

DESCRIPTION OF THE PREFERRED EMBODIMENT

Figure 1:
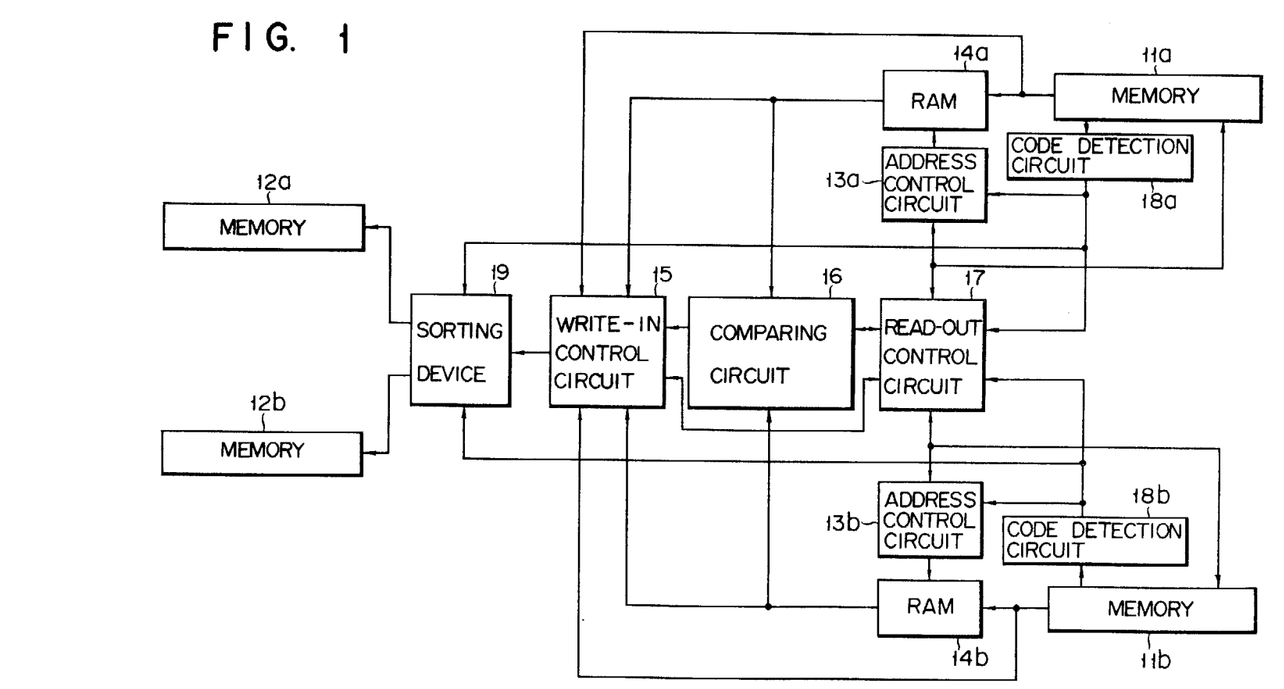
FIG. 1 is a schematic block circuit diagram of an information arranging device according to an embodiment of this invention.
Figure 2:
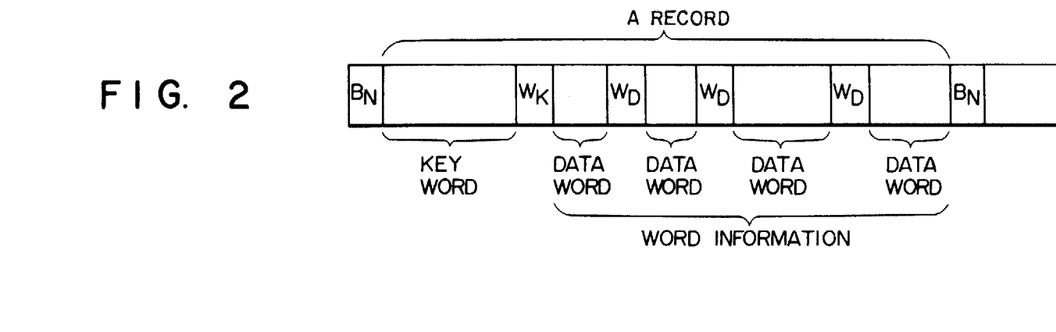
FIG. 2 illustrates a record stored in a memory.
Figure 3:
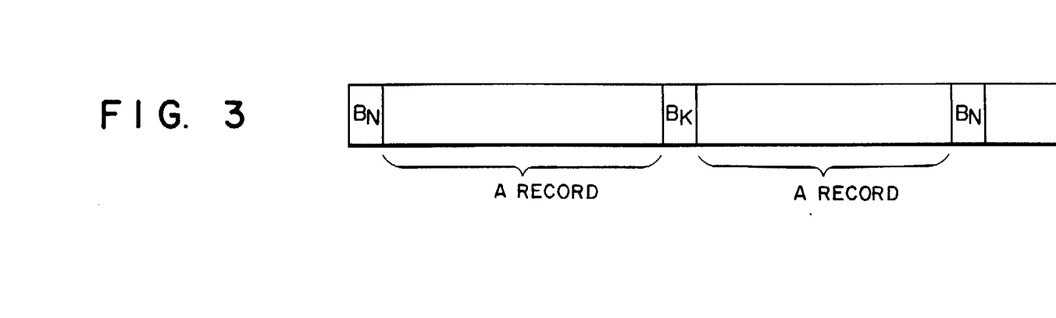
FIG. 3 shows two sequentially arranged information records stored in a memory.
Figure 4A:
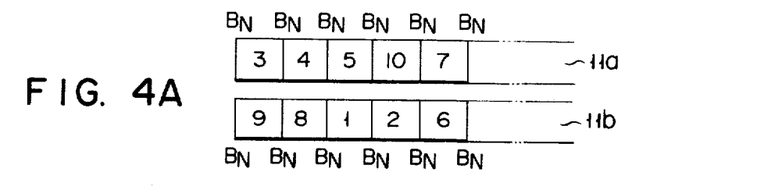
FIGS. 4A to 4D present the successive steps of arranging a series of records units in a prescribed sequential order.
Figure 4B:
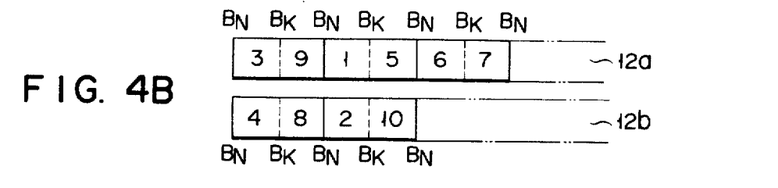
Figure 4C:
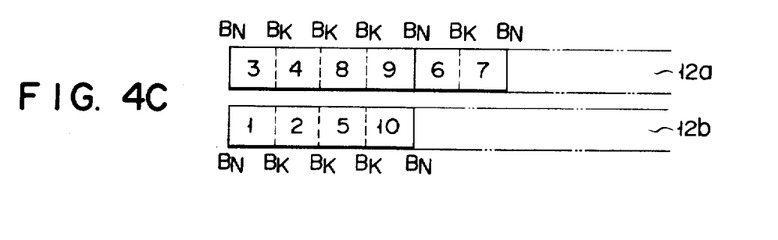

There will now be described by reference to the appended drawings an information unit-arranging device according to the preferred embodiment of this invention. The essential function of this invention will be described below with reference to FIGS. 1 and 2. A series of records containing key words used as a base for determining of sequential order are stored at random in two memories in a state separated from each other by a record-positioning code. A record being recorded comprises a key word like a numerical value as shown in FIG. 2 compared for determination of sequential order and a group of data words separated from the key word by a key word-positioning code WK. Said data words are separated from each other by data word-positioning codes WD. The preceding record is separated from the succeeding one by a record-positioning code BN. These records are stored in series in the first and second memories 11a, 11b. Upon receipt of a read-out instruction code detection circuits 18a, 18b detect the record-positioning code BN of each record. Output signals from the code detection circuits 18a, 18b are supplied to a read-out control circuit 17, a read-out instruction from which is conducted to the aforesaid first and second memories 11a, 11b. The key words of the records following the corresponding codes BN are written in, or read out from, the designated addresses of first and second random access memories (hereinafter referred to as "RAM") 14a, 14b from the above-mentioned first and second memories 11a, 11b respectively. The key words read out from the first and second RAM 14a, 14b are compared in a comparing circuit 16 in respect of the largeness of the numerical values denoted by said key words and set in a prescribed sequential order. Output signals from the comparing circuit 16 which represent the sequentially arranged key words are delivered to a write-in control circuit 15. If a key word stored, for example, in the first RAM 14a is regarded as occupying a higher order in case the increasing sequential order is adopted, then said key word is delivered to a sorting device 19 through the write-in control circuit 15. Thereafter, the following data words are supplied from the first memory 11a to the sorting device 19. This sorting device is provided with a binary counter supplied with record-positioning codes BN1, BN2 from the code detection circuits 18a, 18b respectively and controls the selective sorting of an information block obtained by comparison to determine the sequential order of a record stored in the first RAM 14a which comprises a key word and following data words and another record stored in the second RAM 14b which similarly comprises a key word and following data words, either into the third memory 12a or into the fourth memory 12b. A record read out by priority from the first memory 11a is decided by said sorting device 19 to enter the third memory 12a. When the rear record-positioning code BN is detected by the code detection circuit 18, said code BN is supplied through the read-out control circuit 17 to the write-in control circuit 15 as an instruction for its operation. Said code BN is now converted into a different positioning code BK. After being compared for sequential order, a record stored in the first memory 11a is first written in the third memory 12a and another record stored in the second memory 11b is then written therein with the block-positioning code BK interposed between said sequentially arranged two records as illustrated in FIG. 3, said block being marked off at both ends by information unit-positioning codes BN. Thereafter, succeeding records are read out one after another simultaneously from the first and second memories 11a, 11b. Information blocks obtained by comparing every two records for sequential order are selectively sorted into the third or fourth memory 12a or 12b. When records read out from the first and second memories 11a, 11b are written in the third and fourth memories 12a, 12b in the form of serially arranged blocks, then data stored in the third memory 12a is fed back to the first memory 11a, and data stored in the fourth memory 12b to the second memory 11b. The key words of the respective blocks each already set in a sequential order are now shifted back to the first and second memories 11a, 11b and read out again from the forward ends thereof. Comparison is made among all these key words so as to rearrange them, for example, in an increasing order. The blocks comprised of records whose key words are thus arranged are again written in the third and fourth memories 12a, 12b and then fed back to the first and second memories 11a, 11b. This operation is repeated until the key words of all the records initially stored at random in the first and second memories 11a, 11b collectively present, for example, a complete set of increasing sequential order. This process of sequentially arranging the individual records is illustrated in FIGS. 4A to 4D. Namely, as shown in FIG. 4A, the key words of records are initially stored at random in the first and second memories 11a, 11b. Every two key words read out simultaneously from the forward ends of said memories 11a, 11b are compared by the comparing circuit 16 for initial sequential arrangement to constitute a block, resulting in the pattern of FIG. 4B. This pattern is fed back to the first and second memories 11a, 11b. Comparison is again made among the key words of the respective blocks in order to set them, for example, in the increasing order, showing the pattern of FIG. 4C. Repetition of the above-mentioned operation gives the pattern of FIG. 4D. Further repetition of said operation finally provides a series of key words arranged, for example, in a full set of increasing sequential order as 1, 2, 3, 4, 5, 6, 7, 8, 9 and 10. As apparent from FIGS. 4A to 4D, blocks comprised of sequentially arranged key words have their lengths made twice larger, each time a writing-reading cycle is repeated between the first and second memories 11a, 11b on one hand and the third and fourth memories 12a, 12b on the other.

Figure 5A:
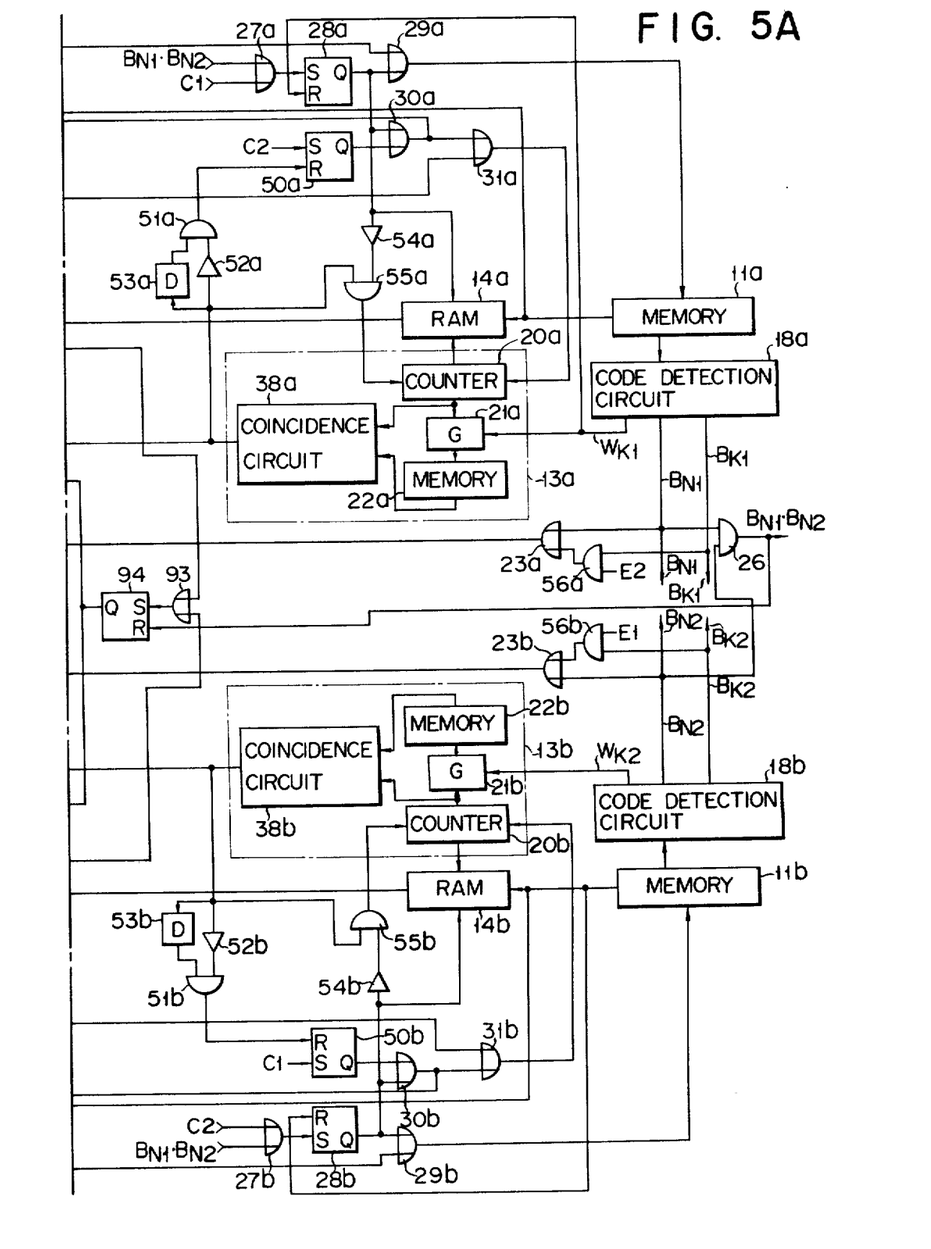
FIGS. 5A and 5B jointly indicate the concrete circuit arrangement of the block circuit diagram (FIG. 1) of the record arranging device according to this invention.
Figure 5B:
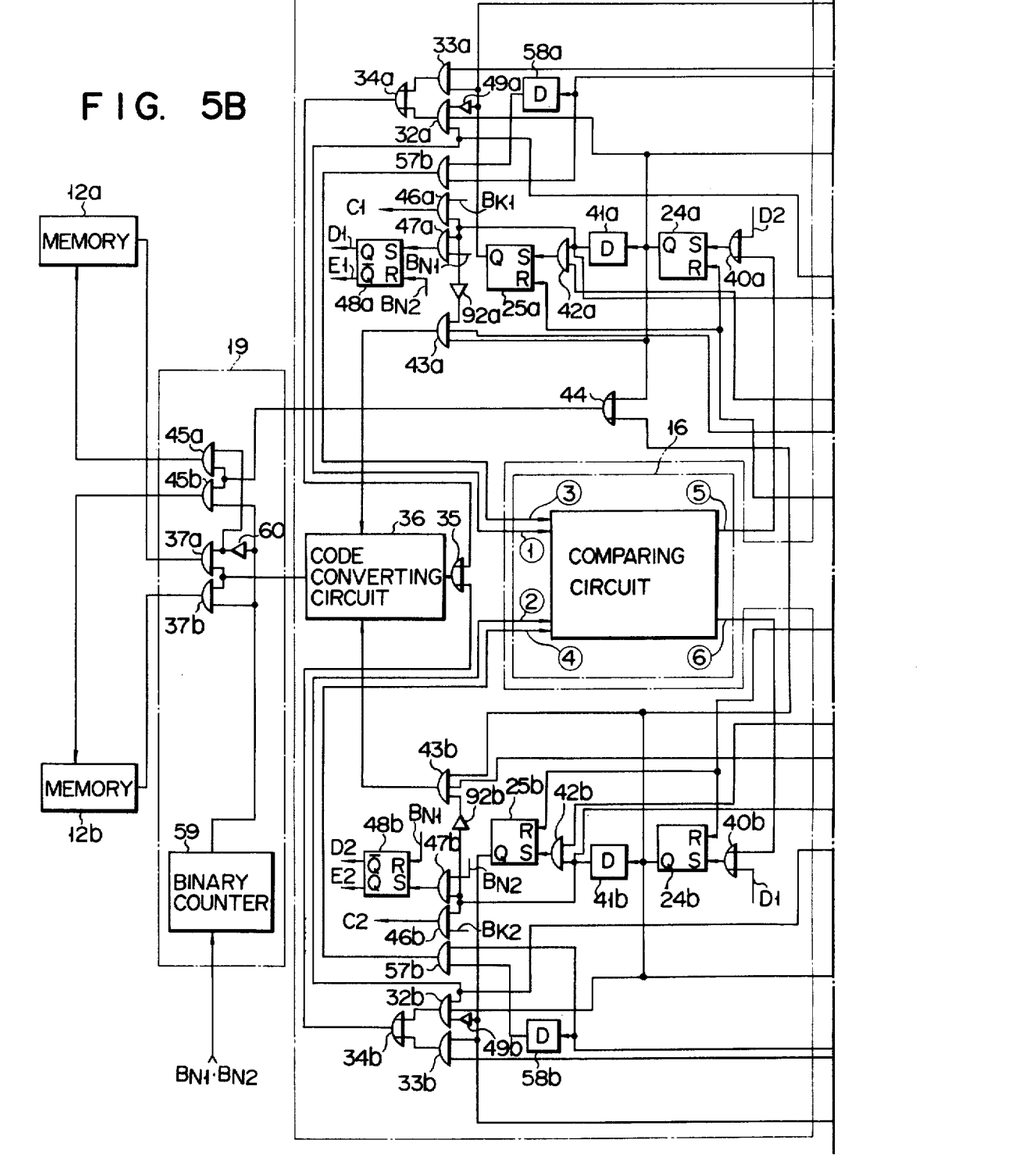
Figure 6:
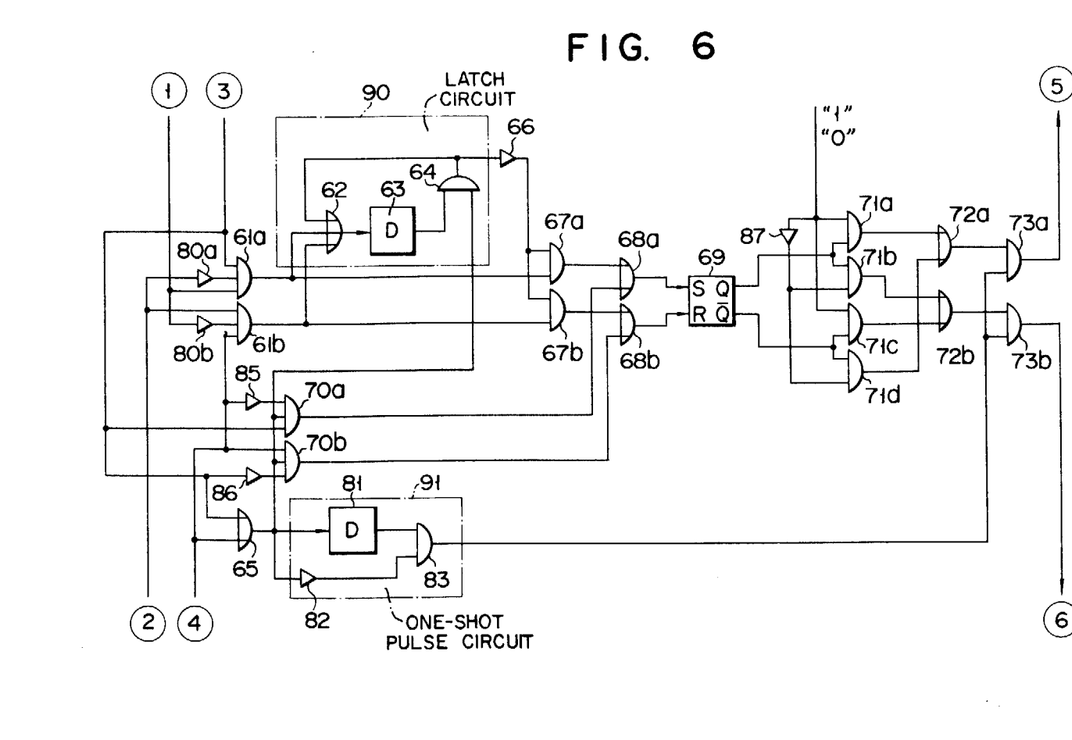
FIG. 6 is a concrete circuit arrangement of the comparing circuit of FIG. 5B.

There will now be described by reference to FIGS. 5A, 5B and 6 the essential function and concrete arrangement of an information unit-arranging device according to this invention. Parts of FIGS. 5A, 5B and 6 the same as those of FIG. 1 are denoted by the same numerals. Further, for briefness, a plurality of pairs of parallel disposed memories operated in the same manner and formed of the same arrangement are jointly described with their numerals indicated side by side.

Address control circuits 13a, 13b are provided with counters 20a, 20b for designating the addresses of RAM's 14a, 14b. Counts made by the counters 20a, 20b act as signals for designating the addresses of the RAM 14a, 14b and are delivered to memories 22a, 22b. The gates 21a, 21b of said memories 22a, 22b are opened by key word-positioning codes WK1, WK2 delivered from code detection circuits 18a, 18b. Where a record-positioning code BN, information block code BK and key word-positioning code WK arrive at that particular numerical order section of the first and second memories 11a, 11b from which reading is to be made, then the code detection circuits 18a, 18b generate detection signals, which are stored in the first and second memories 11a, 11b. Detection signals read out from the first memory 11a are designated as BN1, BK1, WK1 and those delivered from the second memory 11b as BN2, BK2, WK2 respectively.

Detection signals BN1, BN2 generated by the code detection circuits 18a, 18b respectively are delivered as reset signals to flip-flop circuits 24a, 24b and 25a, 25b through the corresponding OR circuits 23a, 23b and also are delivered to the AND circuit 26 and said output signals BN1, BN2 are delivered as set signals to flip-flop circuits 28a, 28b through the corresponding OR circuits 27a, 27b. The flip-flop circuits 28a, 28b are reset upon receipt of the key word-positioning code signals WK1, WK2. Set output signals from the flip-flop circuits 28a, 28b are supplied as read out instructions to the first and second memories 11a, 11b through the OR circuits 29a, 29b, also as write-in instructions to the RAM's 14a, 14b and further as advance instructions to the counters 20a, 20b through the OR circuits 30a, 30b and 31a, 31b. When at this time, supplied with write-in instructions, the RAM's 14a, 14b are stored with records delivered from the first and second memories 11a, 11b in the designated addresses in response to the counts made by the counters 20a, 20b. Key words read out from the RAM's 14a, 14b are conducted to AND circuits 32a, 32b and also as key word-denoting signals 1, 2 to the digit number-comparing circuit 16. Output signals from the first and second memories 11a, 11b are supplied to AND circuits 33a, 33b. Output signals from the AND circuits 32a, 33a and those from the AND circuits 32b, 33b are read out through OR circuits 34a, 34b and conducted to a code converter 36 through an OR circuit 35. When supplied with an instruction, said code converter 36 converts the intervening one of the codes BN of two sequentially arranged records into a different information block code BK. An output signal from the code converter 36 is supplied to AND circuits 37a, 37b and further selectively sorted into the third or fourth memory 12a or 12b.

Output signals from the counters 20a, 20b and memories 22a, 22b of the address control circuits 13a, 13b are transmitted to coincidence detection circuits 38a, 38b. Priority signals 5, 6 from the comparing circuit 16 are supplied to OR circuits 40a, 40b, output signals from which set the flip-flop circuits 24a, 24b. Set output signals from said flip-flop circuits 24a, 24b are delivered to AND circuits 42a, 42b through delay circuits 41a, 41b together with output signals from the coincidence detection circuits 38a, 38b. Output signals from the AND circuits 42a, 42b set the flip-flop circuits 25a, 25b, set output signals from which are transmitted to the OR circuits 31a, 31b and AND circuits 32a, 32b and further to AND circuits 43a, 43b, and also as gate signals to AND circuits 45a, 45b through an OR circuit 44. Output signals from the delay circuits 41a, 41b are delivered through inverters 92a, 92b to the AND circuits 43a, 43b and are delivered to set signals to flip-flop circuit 94 through an OR circuit 93 and also as gate signals to AND circuits 46a, 46b and 47a, 47b which are supplied with code detection signals BK1, BK2, BN1, BN2. Set output signals from the flip-flop circuit 94 are supplied to said AND circuits 43a, 43b as gate signals. Said flip-flop circuit 94 is set by the output signal BN1, BN2 from said AND circuit 26. The AND circuits 46a, 46b give forth output signals C1, C2. Output signals from the AND circuits 47a, 47b set flip-flop circuits 48a, 48b, which are reset by code detection signals BN2, BN1 respectively to generate signals E1, E2, and, when set, produce signals D1, D2. Set output signals from the flip-flop circuits 25a, 25b are conducted to the OR circuits 29a, 29b, AND circuits 33a, 33b and also as gate signals to the AND circuits 32a, 32b through inverters 49a, 49b.

Output signals C1, C2 from the AND circuits 46a, 46b are delivered to the OR circuits 27a, 27b. The signal C2 is supplied as a set signal to a flip-flop circuit 50a which, when set, delivers a signal to the OR circuit 30a. The signal C1 is supplied as a set signal to a flip-flop circuit 50b which, when set, gives forth a signal to the OR circuit 30b. The flip-flop circuits 50a, 50b are reset by output signals from AND circuits 51a, 51b, which are supplied with output signals from the inverters 52a, 52b of the coincidence detection circuits 38a, 38b and output signals from delay circuits 53a, 53b. Output signals from the coincidence detection circuits 38a, 38b are delivered to AND circuits 55a, 55b, together with output signals from inverters 54a, 54b provided at the set terminals of the flip-flop circuits 28a, 28b. Output signals from the AND circuits 55a, 55b are supplied as reset signals to the counters 20a, 20b.

An output signal D1 from the flip-flop circuit 48a is transmitted to the OR circuit 40b. An output signal E1 from said flip-flop circuit 48a is delivered to an AND circuit 56b which receives a detected information block code signal BK2. An output signal from the AND circuit 56b is conducted to the OR circuit 23b. A signal D2 from the flip-flop circuit 48b is transmitted to the OR circuit 40a, and a signal E2 from said flip-flop circuit 48b is supplied to an AND circuit 56a, together with a detected information block code signal BK1. An output signal from said AND circuit 56a is conducted to the OR circuit 23a. Output signals from the OR circuits 30a, 30b are sent to AND circuits 57a, 57b and also thereto through delay circuits 58a, 58b which produce a delay of one character time. Output signals from said AND circuits 57a, 57b are supplied as write-in instructions 3, 4 to the comparing circuit 16.

Output code detection signals BN1, BN2 from said AND circuit 26 are transmitted to a binary counter 59, an output signal from which is supplied as a gate signal to the AND circuits 37b, 45b. An output signal from an inverter 60 is transmitted as a gate signal to the AND circuits 37a, 45a, so as to selectively sort compared key words into the third or fourth memory 12a or 12b.

There will now be described the operation of a record unit-arranging device according to this invention having the above-mentioned circuit arrangement. A plurality of records are initially stored at random in the first and second memories 11a, 11b in a state marked off by a record-positioning code BN. When the codes BN are brought to the reading position of the first and second memories 11a, 11b the code detection circuits 18a, 18b detect said codes BN and generate output signals from the AND gates 26. Output signals from said detection circuits 18a, 18b set the flip-flop circuits 28a, 28b. Output signals from said flip-flop circuits 28a, 28b are supplied as shift instructions to the first and second memories 11a, 11b. Output signals from said first and second memories 11a, 11b are delivered as write-in instructions to the RAM's 14a, 14b. The key words following the codes BN which are used as bases for sequential arrangement are simultaneously written in the RAM's 14a, 14b. At this time, output signals from the flip-flop circuits 28a, 28b pass through the OR circuits 30a, 31a and 30b, 31b respectively and progressively advance the counts made by the counters 20a, 20b of the address control circuits 13a, 13b in synchronization with the read-out of data from the first and second memories 11a, 11b. Key words are stored in the addresses of the RAM's 14a, 14b which are designated by counts made by the counters 20a, 20b.

The key word-positioning codes WK1, WK2 following the key words of the respective records are detected by the code detection circuits 18a, 18b. Output signals from said code detection circuits 18a, 18b open the gates 21a, 21b, causing the counts made by the counters 20a, 20b to be stored in the memories 22a, 22b. At this time, output signals from the coincidence circuits 38a, 38b are supplied to the AND circuits 55a, 55b, and the signals denoting said codes WK1, WK2 from said code detection circuits reset the flip-flop circuits, thereby stopping the writing of key words in the RAM's 14a, 14b. Accordingly, the AND circuits 55a, 55b generate output signals which are supplied as reset signals to the counter 20a, 20b to clear the counts made thereby. Concurrently, the key words stored in the RAM's 14a, 14b are read out as input signals 1, 2 to the comparing circuit 16. In this case, as the flip-flop circuits 28a, 28b are set, outputs generated from the flip-flop circuits 28a, 28b through the OR circuits 30a, 30b are delayed by one character time in the delay circuits 58a, 58b to act as write-in instructions 3, 4. Upon receipt of said write-in instructions 3, 4, the input key word signals 1, 2 delivered from the RAM's 14a, 14b are written in the comparing circuit 16. Where, at this time, the input key word signals represent, for example [3], [9] respectively as shown in FIG. 4A, and the increasing sequential order is to be adopted, then the input key word signal 1 delivered from the first RAM 14a is read out by priority from the comparing circuit 16 as an output signal 5 showing the result of comparison.

The operation of the comparing circuit 16 will be described later. The output signal showing the result of comparison or judgement signal 5 is supplied as a set signal to the flip-flop circuit 24 through the OR circuit 40, an output signal from which is delivered to the counter 20a of the address control circuit 13a to be counted thereby. Upon receipt of an output count signal from the counter 20a as a read-out instruction, the RAM 14a supplies the AND circuit 32a with signals denoting the record-positioning code BN and the following key word as gate signals. Since, at this time, the flip-flop circuit 25a remains reset, a key word signal from the RAM 14a enters the sorting device 19 having the binary counter 59 upon receipt of an output signal from the inverter 49a through the AND circuit 32a, OR circuits 34a, 35 and code-converting circuit 36 in turn. Where the binary counter 59 makes a count of zero, an output signal from the code-converting circuit 36 is written in the third memory 12a through the AND circuit 37a upon receipt of an output signal from an inverter 60. When all the key words stored in the RAM 14a are read out, then an output signal from the coincidence circuit 38a is supplied to one of the gates of the AND circuit 42a. An output signal from the flip-flop circuit 24a is delayed by one digit time or one character shift time in the delay circuit 41a, an output signal from which is supplied as a gate signal to the other gate of the AND circuit 42a. The judgement output signal 5 is delivered as a set signal to the flip-flop circuit 24a. An output signal from the AND circuit 42a sets the flip-flop circuit 25a. An output set signal from said flip-flop circuit 25a opens one of the gates of the AND circuit 33a. Signals denoting data words following the key word stored in the RAM 14a pass through the AND circuit 33a, OR circuits 34a, 35 and code-converting circuit 36 in turn and are stored in the third memory 12a after sorted by the sorting device 19.

Where a record taking the foremost position in the first memory 11a is shifted to the third memory 12a, the code detection circuit 18a again detects a record-positioning code BN to reset the flip-flop circuits 24a, 25b, and stop writing in the third memory 12a from the first memory 11a. At this time, an output signal from the AND circuit 47a sets the flip-flop circuit 48a, which in turn generates a signal D1. As a result, the flip-flop circuit 24b is set by the OR circuit 40b, causing data stored in the RAM 14b to be read out through the AND circuit 32b. In succession, the data stored in the second memory 11b is read out through the AND circuit 33b. Thereafter the data stored in the second memory 11b is read out through the AND circuit 33b and stored in the third memory 12a in succession to the record previously written therein. Detection of a signal denoting record-positioning code BN delivered from the a record-positioning detection circuit 18b completes a cycle of sequentially arranging every two consecutive information units.

Figure 4D:
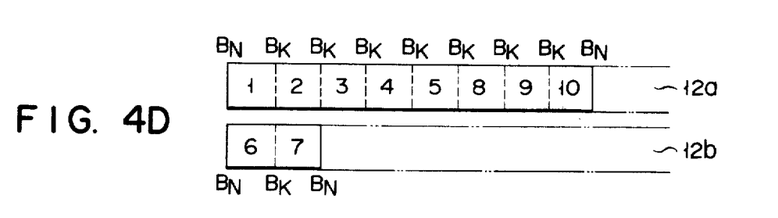

At this time, the code-converting circuit 36 is supplied with an instruction signal at a time delay from the setting of the flip-flop circuits 24a, 24b through the action of the delay circuits 41a, 41b. Upon receipt of said instruction signal, the code-converting circuit 36 converts the record-positioning code BN into a different information block code BK.

Where the delay circuits 41a, 41b carry out a delay of one digit time or one character shift time, then the code BN taking the foremost position in the first memory 11a is read out immediately. Since an output signal from the delay circuit 41a still remains issued at the time when the code BN2 taking the foremost position in the second memory 11b is supplied to the code-converting circuit 36, said code BN2 is converted into a different information block code BK and written in the third memory 12a. When the treatment of the records respectively occupying the foremost position in the first and second memories 11a, 11b is finished, then the detected code signals BN1, BN2 still remain issued from the code detection circuits 18a, 18b, causing the AND circuit 26 to give forth a signal and the flip-flop circuit 94 is reset. The same treatment is repeated with respect to the records taking by turns the foremost position in the first and second memories 11a, 11b. Each time the above-mentioned treatment is carried out, an output signal from the binary counter 59 is inverted, causing a record read out from the OR circuit 35 to be stored in the fourth memory 12b after sorted by the sorting device 19. Due to inversion of an output signal from the binary counter 59 each time the above-mentioned treatment is carried out, the third and fourth memories 12a, 12b are alternatively stored with blocks each comprised of two sequentially arranged records, thus changing the stored pattern from FIG. 4A to FIG. 4B. When all the records stored in the first and second memories 11a, 11b are written in the third and fourth memories 12a, 12b in turn, the data stored in the third memory 12a is fed back to the first memory 11a and the data stored in the fourth memory 12b to the second memory 11b, bringing about a condition ready for a second time comparison. When, under the above-mentioned condition, the code detection circuits 18a, 18b generate detected code signals BN1, BN2, then the flip-flop circuits 28a, 28b are again set and comparison is made by the comparing circuit 16 among the numerical largenesses denoted by the key words of the respective blocks (now made twice longer than in the preceding case) taking the foremost position in the first and second memories 11a, 11b. As a result, said digit number-comparing circuit 16 gives forth, for example, an output judgment signal 5. Thus the foremost block stored in the first memory 11a is written, for example, in the third memory 12a by sorting according to the count made by the binary counter 59. The foremost block stored in the first memory 11a before shifted to the third memory 12a comprises, as shown in FIG. 3, of two sequentially arranged records separated from each other by the code BK1, with both ends of said block marked off by the code BN1. When said foremost block is read out from the first memory 11a, the code detection circuit 18a detects the information block code BK1. The flip-flop circuit 48b which is reset at this time gives forth a signal E2. When, therefore, the code detection circuit 18a produces a signal denoting the code BK1, the AND circuit 56a generates an output signal to reset the flip-flop circuits 24a, 25a. At this time the AND circuit 46a sends forth an output signal C1 to set the flip-flop circuits 28a, 50b. As a result, the key words of the foremost block stored in the first memory 11a which comprises two sequentially arranged records are written in the RAM 14a and read out therefrom to the comparing circuit 16. On the other hand, the key words of the foremost block in the second memory 11b which comprise two sequentially arranged records are written in the RAM 14b and read out therefrom to the comparing ciruit 16. Thus comparison is made by the comparing circuit 16 among the key words of these two foremost blocks to define their sequential order. The compared key words are stored in the third memory 12a in a sequential order, changing the stored key word pattern from FIG. 4B to FIG. 4C. Further comparison presents, as shown in FIG. 4D, a pattern of sequentially arranged key words stored in the third memory 12a. Repetition of comparison of the key words of records which were initially stored at random in the first and second memories 11a, 11b finally provides a series of key words constituting a full set of prescribed sequential order as 1, 2, 3, 4, 5, 6, 7, 8, 9 and 10.

There will now be described by reference to FIG. 6 the arrangement of the digit number-comparing circuit 16. A key word signal 1 delivered from the RAM 14a which denotes a key word being later compared for sequential order is directly supplied to the gate of an AND circuit 61a and indirectly to the gate of an AND circuit 61b through an inverter 80b. On the other hand, a key word signal 2 supplied from the RAM 14b is directly transmitted to the gate of the AND circuit 61b and indirectly to the gate of the AND circuit 61a through an inverter 80a. The other gate of the AND circuit 61a is supplied with a signal showing the result of comparison or judgment signal 3 acting as a write-in instruction for the above-mentioned input key word signal 1. The other gate of the AND circuit 61b is supplied with a similar judgment signal 4 acting as a write-in instruction for the aforesaid input key word signal 2. An output signal from the AND circuit 61a is conducted to the gate of an AND circuit 67a. An output signal from the AND circuit 61b is transmitted to one of the gates of an AND circuit 67b. The other gates of the AND circuits 67a, 67b are supplied with output signals from the AND circuits 61a, 61b respectively through a holding circuit 90 for holding the input key word signals 1, 2 and inverter 66. The holding circuit 90 comprises series connected OR circuit 62, delay circuit 63 and AND circuit 64. The other gate of the AND circuit 64 is supplied with the judgment signals 3, 4 through an OR circuit 65. An output signal from the AND circuit 64 is conducted through the AND circuits 61a, 61b, outputs from which are delivered to the OR circuit 62 and further through the delay circuit 63, thus making a circulatory flow through the elements 62, 63, 64. An output signal from the AND circuit 67a is delivered as a set signal to a flip-flop circuit 69 through an OR circuit 68a. An output signal from the AND circuit 67b is transmitted as a reset signal to the flip-flop circuit 69 through an OR circuit 68b. An output set signal from the flip-flop circuit 69 is transmitted to one gate of each of AND circuits 71a, 71b. An output reset signal from said flip-flop circuit 69 is delivered to one gate of each of AND circuits 71c, 71d. The other gates of the AND circuits 71a, 71c are supplied with a sequential order instruction, namely, a "1" signal where the decreasing sequential order is adopted or a "0" signal where the increasing sequential order is used. Said sequential order instruction signal "1" or "0" is transmitted to the other gates of the AND circuits 71b, 71d through an inverter 87. Output signals from the AND circuits 71a, 71d are read out as a judgment signal 5 first through the common OR circuit 72a and then through AND circuit 73a. The other gate of the AND circuit 73a is supplied with an output signal from the OR circuit 65 through a one shot circuit 91. Said one shot circuit 91 comprises a delay circuit 81, inverter 82 and an AND circuit 83, the gate of which is supplied with output signals from said delay circuit 81 and inverter 82. Output signals from the AND circuits 71b, 71c are drawn out as a similar judgment signal 6 through the common OR circuit 72b and then AND circuit 73b. The other gate of said AND circuit 73b is supplied with an output signal from the aforesaid one shot circuit 91. Where the key words being compared for sequential order have different numbers of digits, one of the write-in instructions 3, 4 is not supplied. Where comparison is to be made under such condition, the write-in instruction 3, for example, is supplied to the gate of the OR circuit 68a through the AND circuit 70a, and the other write-in instruction 4 is transmitted to the gate of the OR circuit 68b through the AND circuit 70b. At this time, the gate of the AND circuit, 70a is supplied with the write-in instruction 3, an input obtained by conducting said write-in instruction 3 through the OR circuit 65 and another input obtained by delivering the other write-in instruction 4 through an inverter 85. The AND circuit 70b is supplied with the write-in instruction 4, an input obtained by passing said write-in instruction 4 through the OR circuit 65 and another input obtained by conducting the write-in instruction 3 through an inverter 86.

There will now be described the operation of the digit number-comparing circuit 16. Where the input key word signal 1 denotes a sequential order information "3" and the input key word signal 2 shows a sequential order information "9", and these informations are to be stored in the third memory 12a in the increasing sequential order, namely, in the order of "3" – "9", as the information 3 and 9 are respectively denoted by "0011" and "1001" in the binary coded system. Then the key word signal 1 denoting said information 3 is obtained through an inverter 80b and the key word signal 2 denoting the information 9 is also produced. At this time the AND circuit 61b gives forth an output signal, which is delivered to the gate of the AND circuit 67b. While the write-in instructions 3, 4 continue to be generated, an output signal from said AND circuit 61b is transmitted to the gate of the AND circuit 64 included in the stored data-holding circuit 90 which is comprised of said AND circuit 64, OR circuit 62 and delay circuit 63 so as to be kept stored in said holding circuit 90 by making a circulatory flow therethrough.

At this time the AND circuits 67a, 67b remain closed. An output signal from the AND circuit 67b continues to be generated for a length of time corresponding to a time of delay provided by the delay circuit 63 after the issue of an output signal from the AND circuit 61b, and is supplied as a reset signal to the flip-flop circuit 69 through the OR circuit 68b. A Q output signal from said flip-flop circuit 69 is delivered to the gates of the AND circuits 71c, 71d. A "0" signal produced at this time as an instruction for the increasing sequential order is transmitted to the gate of the AND circuit 71d through the inverter 87. An output signal from the AND circuit 71d is drawn out as a write-in instruction 5 through the OR circuit 72a and AND circuit 73a, the gate of which is opened by an output signal from the one shot circuit 91. As the result, a signal denoting the digit 3 supplied from the first memory 11a is stored in the third memory 12a by priority after compared for sequential order. Where a signal denoting the digit 9 stored in the second memory 11b is to be read out therefrom by priority to define a sequential order with the digit 3, then a sequential order-instruction signal 1 is supplied to the digit number-comparing circuit 16. Then a Q output signal from the flip-flop circuit 69 is conducted to the gate of the AND circuit 61c, an output signal from which is drawn out as a write-in instruction 6 through the OR circuit 72b and AND circuit 73b in turn, causing the key word signal denoting the digit 9 which has been read out from the second memory 11b to be stored in the third memory 12a.

Where the digit 9 is stored in the first memory 11a and the digit 3 is stored in the second memory 11b and these digits are to be arranged in the decreasing sequential order 9 − 3, then a key word signal 1 is supplied as a set signal to the flip-flop circuit 69 through the AND circuits 61a, 67a and OR circuit 68a in turn. A Q output signal from the flip-flop circuit 69 is transmitted to the gate of the AND circuit 71a. An output signal delivered by the AND circuit 71a upon receipt of a sequential order-instructing signal 1 is drawn out as a write-in instruction 5 through the OR circuit 72a and AND circuit 73, the gate of which is opened by an output signal from the one shot circuit 91, causing the digit 9 stored in the first memory 11a to be read out therefrom ahead of the digit 3 and written in the third memory 12a. Where the digit 3 stored in the second memory is to be read out by priority to define a sequential order with the digit 9 , then a sequential order-instructing signal 0 is supplied to the comparing circuit 16. As a result, a Q output signal from the flip-flop circuit 69 is delivered to the gate of the AND circuit 71b and drawn out as a write-in instruction 6 through the OR circuits 72b, 73b, causing the digit 3 to be written by priority in the third memory 12a.

Where a value denoted by the key word stored in the first memory 11a has a different number of digits from that of the key word stored in the second memory 11b, then only one of the write-in instructions 3, 4 is given forth. For example, where the key word stored in the first memory 11a has a larger number of digits, then the write-in instruction 3, but not the write-in instruction 4, is supplied as a set signal to the flip-flop circuit 69 through the OR circuit 68a. A Q output signal from said flip-flop circuit 69 is conducted to the gates of the AND circuits 71a, 71b. Since the key word stored in the first memory 11a has a larger number of digits, the AND circuit 71a generates an output signal upon receipt of a sequential order-instructing signal 1. As a result, the judgment signal 5 is drawn out through the OR circuit 72a and AND circuit 73a, causing the key word stored in the first memory 11a, which has a larger number of digits to be written by priority in the third memory 12a. Judgment is made of whether a different key word occupies the same order as that which has a larger number of digits. The flip-flop circuit 69 gives forth a Q or Q output signal through the OR circuit 68a or 68b, depending on whether a signal showing the result of the above-mentioned judgment was generated from the AND circuit 70a or 70b. Said Q or Q output signal is supplied to the gates of the AND circuits 71a to 71d. A judgment signal 5 or 6 is drawn out from the selected one of the AND circuits 71a to 71d through a route of the OR circuit 72a and AND circuit 73a or a route of the OR circuit 72b and AND circuit 73b.

According to the foregoing embodiment, the first and second memories 11a, 11b on the input side are shown to be separate from the third and fourth memories 12a, 12b on the output side. In practical application, however, it is necessary to shift data in the third memory 12a back to the first memory 11a and data in the fourth memory 12b back to the second memory 11b. Obviously therefore, it is possible to assemble the first and third memories 11a, 12a into a single memory system and the second and fourth memories 11b, 12b into another single memory system. Where it is desired to treat a larger amount of stored data, it is advisable to connect, for example, a magnetic core or magnetic tape stored with data in series to the input side of the first and second memories 11a, 11b, namely, to provide two independent memory units comprised of these memories and magnetic elements. According to said embodiment, record-positioning codes and information block codes are of different type to facilitate the detection of these codes. In practice, however, the number of information blocks each marked off by the corresponding codes (for example, the codes BN as illustrated in FIG. 4) at the forward and rear ends can be determined from the number of repeated comparisons. In other words, detection of said information block codes BN can be effected by counting intervening record-positioning codes (for example, BK) in the code detection circuit 18. Namely, it is possible to adopt the same type of record and information block- positioning codes and distinguish the contents of these codes by the counter circuit 20. Further according to the above-mentioned embodiment, the foremost word of each record is taken as a key word. However, any data word occupying a given order in each record may be used as a key word, and supplied to the digit number-comparing circuit 16. In this case, higher efficiency can be attained by storing separate memories with records read out from the first and second memories 11a, 11b.

As mentioned above, this invention enables records initially stored at random in memories to be arranged in a prescribed sequential order by repeating a cycle of comparing the numerical largenesses of the key words of the information units and very easily carries out their collection and sequential arrangement, thus displaying a prominent effect in treating data, for example, by an electronic computer.

What is claimed is:
1. An information-arranging device comprising:
   two input memory means each for storing one group of records, each record comprising a plurality of words including at least one key word, said records being arranged serially with record positioning codes (BN) or different positioning codes (BK) interposed among them;

comparator means coupled to said input memory means for comparing the key words of any two records read out from said two input memory means, respectively, and generating a comparison output signal;

output memory means coupled to said input memory means and to said comparator means for storing, in response to a comparison output signal from said comparator means, one of the compared two records whose key word has priority and then the other record, together with a converted positioning code therebetween;

means for converting a record positioning code (BN) between any two records whose key words have been compared into a different positioning code (BK) before the records are stored in said output memory means;

positioning code-discriminating means coupled to said input memory means for determining whether a positioning code following each record read out from said input memory means is a record positioning code (BN) or a different positioning code (BK);

control circuit means coupled to said memory means, comparing means and positioning code-discriminating means for causing, when a record positioning code (BN) is detected by said positioning code-discriminating means, at least one record whose key word has been compared by said comparator means and has no priority to be stored in said output memory means after the record whose key word has been compared with that of said record and has priority, until a different positioning code (BK) is detected by said positioning code-discriminating means, and causing, when a different postioning code (BK) is detected by said positioning code-discriminating means, the keyword of a record following said different positioning code (BK) to be compared with the non-priority key word of said record, thereby storing in said output memory means one of the two records whose key word has priority upon receipt of a comparison output signal from said comparator means;

means for causing said comparator means to repeatedly compare the key words of two records at least one of which is different from the prior compared records; and means coupled to said input memory means for transferring to said two input memory means the records stored in said output memory means when all of said stored records are stored in the output memory means in a sequential order determined by the key word comparison repeatedly effected by said comparator means.

2. The information-arranging device according to claim 1, wherein each of said two input memory means includes a buffer memory.

3. The information-arranging device according to claim 2, wherein each of said buffer memories is a random access memory.

4. The information-arranging device according to claim 1, wherein said output memory means comprises two memory devices coupled together.

5. The information-arranging device according to claim 4, wherein said two memory devices have a record sorting means for sorting any two records whose key words have been compared by said comparator means when said two records are being stored in said two memory devices, respectively.

6. The information-arranging device according to claim 1, wherein said input and output memory means are comprised of a single memory device.

* * * * *